(12) United States Patent
Czoykowski et al.

(10) Patent No.: US 8,567,580 B2
(45) Date of Patent: Oct. 29, 2013

(54) ELECTRO-HYDRAULIC CONTROL SYSTEM FOR A DUAL CLUTCH TRANSMISSION

(75) Inventors: John R. Czoykowski, Grosse Pointe Park, MI (US); Philip C. Lundberg, Keego Harbor, MI (US); Steven P. Moorman, Dexter, MI (US); Bret M. Olson, Whitelake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 248 days.

(21) Appl. No.: 12/974,798

(22) Filed: Dec. 21, 2010

(65) Prior Publication Data

US 2011/0180364 A1 Jul. 28, 2011

Related U.S. Application Data

(60) Provisional application No. 61/297,490, filed on Jan. 22, 2010.

(51) Int. Cl.
*F16D 25/10* (2006.01)

(52) U.S. Cl.
USPC ..................................... 192/3.58; 192/48.601

(58) Field of Classification Search
None
See application file for complete search history.

(56) References Cited

U.S. PATENT DOCUMENTS

| | | |
|---|---|---|
| 3,834,499 A | 9/1974 | Candellero et al. |
| 4,653,352 A | 3/1987 | Nakao et al. |
| 4,944,202 A | 7/1990 | Gierer |
| 5,441,459 A | 8/1995 | Inukai et al. |
| 6,698,304 B2 | 3/2004 | Gierling et al. |
| 6,715,597 B1 | 4/2004 | Buchanan et al. |
| 6,789,658 B2 | 9/2004 | Busold et al. |
| 6,827,191 B2 | 12/2004 | Kuhstrebe |
| 6,883,394 B2 | 4/2005 | Koenig et al. |
| 6,941,830 B2 | 9/2005 | Ibamoto et al. |
| 7,300,375 B2 | 11/2007 | Petrzik |
| 7,401,689 B2 | 7/2008 | Hegerath et al. |
| 7,464,617 B2 | 12/2008 | Baldascini et al. |
| 7,464,618 B2 | 12/2008 | Mohlmann et al. |
| 7,472,616 B2 | 1/2009 | Dreher et al. |
| 7,478,572 B2 | 1/2009 | Maten et al. |
| 7,487,866 B2 | 2/2009 | Kruse et al. |
| 7,591,203 B2 | 9/2009 | Ochi et al. |
| 7,849,986 B2 * | 12/2010 | Kitou et al. ................... 192/3.58 |
| 2001/0036878 A1 | 11/2001 | Itou et al. |
| 2002/0060113 A1 | 5/2002 | Harries |
| 2002/0119864 A1 | 8/2002 | Harries |
| 2003/0075408 A1 | 4/2003 | Alfredsson |

(Continued)

FOREIGN PATENT DOCUMENTS

| | | |
|---|---|---|
| DE | 2141564 A1 | 2/1973 |
| DE | 4117736 C1 | 5/1992 |

(Continued)

*Primary Examiner* — David D Le
*Assistant Examiner* — Mark Manley (57) ABSTRACT

A hydraulic control system for a dual clutch transmission includes a plurality of pressure and flow control devices and logic valve assemblies in fluid communication with a plurality of clutch actuators and with a plurality of synchronizer actuators. The clutch actuators are operable to actuate a plurality of torque transmitting devices and the synchronizer actuators are operable to actuate a plurality of synchronizer assemblies. Selective activation of combinations of the pressure control solenoids and the flow control solenoids allows for a pressurized fluid to activate at least one of the clutch actuators and synchronizer actuators in order to shift the transmission into a desired gear ratio.

11 Claims, 4 Drawing Sheets

(56) References Cited

U.S. PATENT DOCUMENTS

| | | |
|---|---|---|
| 2003/0226416 A1 | 12/2003 | Umemoto et al. |
| 2004/0038765 A1 | 2/2004 | Fujimine et al. |
| 2005/0067251 A1 | 3/2005 | Braford, Jr. et al. |
| 2005/0107214 A1 | 5/2005 | Koenig |
| 2006/0005647 A1* | 1/2006 | Braford et al. ............. 74/335 |
| 2006/0046897 A1 | 3/2006 | Mohlmann |
| 2007/0175726 A1 | 8/2007 | Combes et al. |
| 2008/0127760 A1* | 6/2008 | John et al. ............. 74/335 |
| 2008/0207392 A1 | 8/2008 | Staudinger et al. |
| 2008/0210032 A1 | 9/2008 | Uberti et al. |
| 2008/0223683 A1 | 9/2008 | Grethel |
| 2009/0000897 A1 | 1/2009 | Staudinger et al. |
| 2009/0151495 A1 | 6/2009 | Garabello et al. |
| 2009/0157271 A1 | 6/2009 | Garabello et al. |
| 2010/0096232 A1* | 4/2010 | Buchanan et al. ............. 192/3.61 |

FOREIGN PATENT DOCUMENTS

| | | |
|---|---|---|
| DE | 4320353 A1 | 1/1994 |
| DE | 29714652 U1 | 10/1997 |
| DE | 19921301 A1 | 11/1999 |
| DE | 19849488 A1 | 5/2000 |
| DE | 19931973 A1 | 1/2001 |
| DE | 10125172 A1 | 11/2002 |
| DE | 10134115 A1 | 1/2003 |
| DE | 10243282 A1 | 4/2004 |
| DE | 102005029963 A1 | 2/2007 |
| DE | 102005029964 A1 | 3/2007 |
| DE | 102008008454 A1 | 9/2008 |
| DE | 102008058692 A1 | 6/2009 |
| EP | 0477564 A2 | 4/1992 |
| EP | 1400733 A2 | 3/2004 |
| EP | 1433976 A1 | 6/2004 |
| EP | 1469235 A1 | 10/2004 |
| EP | 1519082 A1 | 3/2005 |
| EP | 1589262 A1 | 10/2005 |
| EP | 1645786 A2 | 4/2006 |
| EP | 1767824 A1 | 3/2007 |
| EP | 2151586 A2 | 2/2010 |
| FR | 2808065 A1 | 10/2001 |
| JP | 58102851 A | 8/1983 |
| JP | 2007010145 A | 1/2007 |
| WO | WO9705410 A1 | 2/1997 |
| WO | WO9919644 A1 | 4/1999 |
| WO | WO2004097265 A1 | 11/2004 |
| WO | WO2008/108977 * | 9/2008 |
| WO | WO2009037170 A1 | 3/2009 |
| WO | WO2010028745 A2 | 3/2010 |

* cited by examiner

ELECTRO-HYDRAULIC CONTROL SYSTEM FOR A DUAL CLUTCH TRANSMISSION

CROSS-REFERENCE TO RELATED APPLICATIONS

This application claims the benefit of U.S. Provisional Application No. 61/297,490, filed on Jan. 22, 2010, which is hereby incorporated in its entirety herein by reference.

TECHNICAL FIELD

The invention relates to a control system for a dual clutch transmission, and more particularly to an electro-hydraulic control system having a plurality of solenoids and valves operable to actuate a plurality of actuators within the dual clutch transmission.

BACKGROUND

A typical multi-speed, dual clutch transmission uses a combination of two friction clutches and several dog clutch/synchronizers to achieve "power-on" or dynamic shifts by alternating between one friction clutch and the other, with the synchronizers being "pre-selected" for the oncoming ratio prior to actually making the dynamic shift. "Power-on" shifting means that torque flow from the engine need not be interrupted prior to making the shift. This concept typically uses countershaft gears with a different, dedicated gear pair or set to achieve each forward speed ratio. Typically an electronically controlled hydraulic control circuit or system is employed to control solenoids and valve assemblies. The solenoid and valve assemblies actuate clutches and synchronizers to achieve the forward and reverse gear ratios.

While previous hydraulic control systems are useful for their intended purpose, the need for new and improved hydraulic control system configurations within transmissions which exhibit improved performance, especially from the standpoints of efficiency, responsiveness and smoothness, is essentially constant. Accordingly, there is a need for an improved, cost-effective hydraulic control system for use in a dual clutch transmission.

SUMMARY

A hydraulic control system for a dual clutch transmission includes a plurality of pressure and flow control devices and logic valves in fluid communication with a plurality of clutch actuators and with a plurality of synchronizer actuators. The clutch actuators are operable to actuate a plurality of torque transmitting devices and the synchronizer actuators are operable to actuate a plurality of synchronizer assemblies. Selective activation of combinations of the pressure control solenoids and the flow control solenoids allows for a pressurized fluid to activate at least one of the clutch actuators and synchronizer actuators in order to shift the transmission into a desired gear ratio.

In one example of the hydraulic control system, the hydraulic control system includes an electric pump and an accumulator that provide a pressurized hydraulic fluid.

In another example of the hydraulic control system, the hydraulic control system includes one pressure control device and two flow control devices operable to actuate the dual clutch.

In yet another example of the hydraulic control system, the hydraulic control system includes two pressure control devices, two flow control devices, and two logic valves operable to actuate the plurality of synchronizer assemblies.

Further features, aspects and advantages of the present invention will become apparent by reference to the following description and appended drawings wherein like reference numbers refer to the same component, element or feature.

BRIEF DESCRIPTION OF THE DRAWINGS

The drawings described herein are for illustration purposes only and are not intended to limit the scope of the present disclosure in any way.

DESCRIPTION

Figure 1:
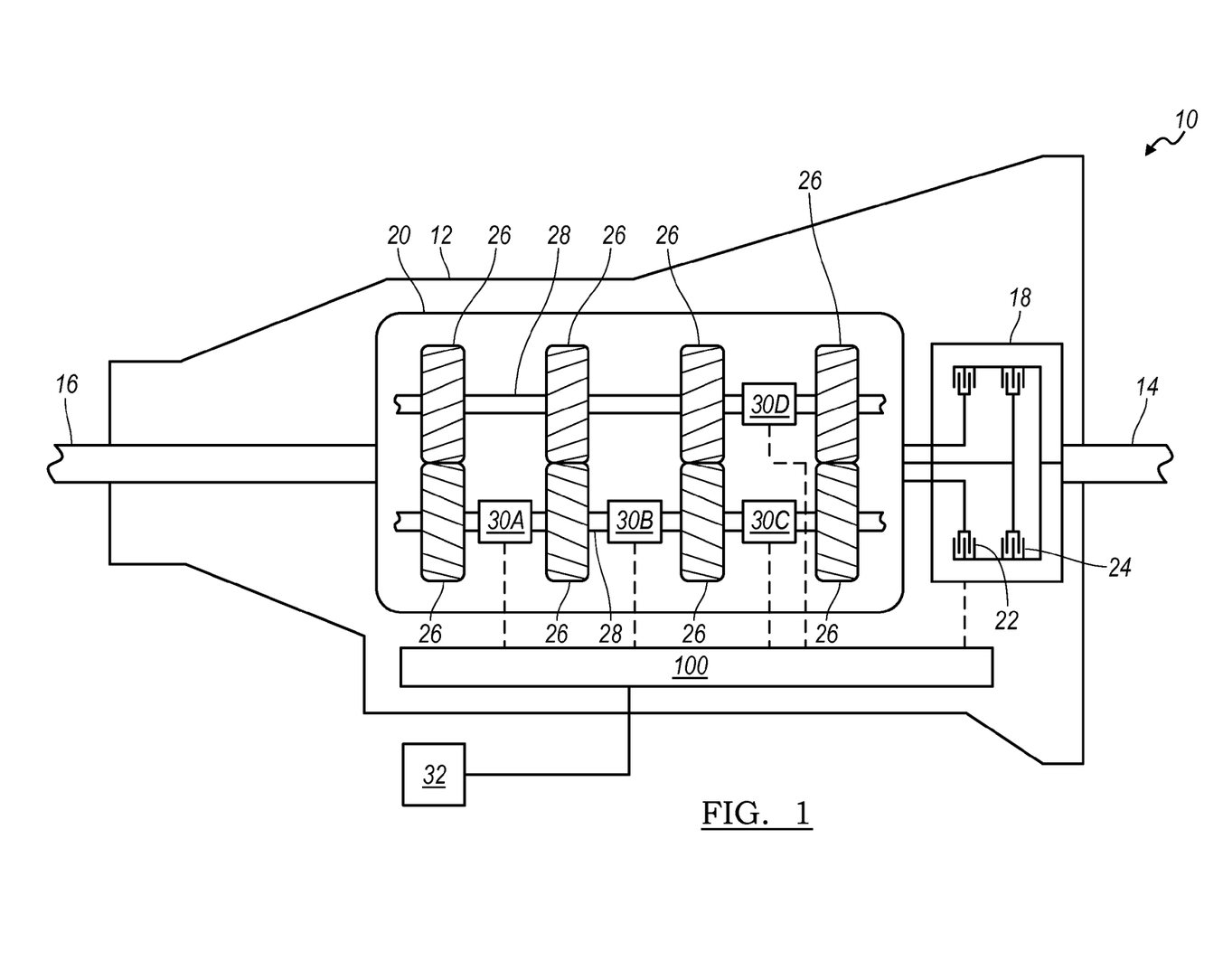
FIG. 1 is a schematic diagram of an exemplary dual clutch transmission having a hydraulic control system according to the principles of the present invention.

With reference to FIG. 1, an exemplary dual clutch automatic transmission incorporating the present invention is illustrated and generally designated by the reference number 10. The dual clutch transmission 10 includes a typically cast, metal housing 12 which encloses and protects the various components of the transmission 10. The housing 12 includes a variety of apertures, passageways, shoulders and flanges which position and support these components. While the housing 12 is illustrated as a typical rear wheel drive transmission, it should be appreciated that the transmission 10 may be a front wheel drive transmission or a rear wheel drive transmission without departing from the scope of the present invention. The transmission 10 includes an input shaft 14, an output shaft 16, a dual clutch assembly 18, and a gear arrangement 20. The input shaft 14 is connected with a prime mover (not shown) such as an internal combustion gas or Diesel engine or a hybrid power plant. The input shaft 14 receives input torque or power from the prime mover. The output shaft 16 is preferably connected with a final drive unit (not shown) which may include, for example, propshafts, differential assemblies, and drive axles. The input shaft 14 is coupled to and drives the dual clutch assembly 18. The dual clutch assembly 18 preferably includes a pair of selectively engageable torque transmitting devices including a first torque transmitting device 22 and a second torque transmitting device 24. The torque transmitting devices 22, 24 are preferably dry clutches. The torque transmitting devices 22, 24 are mutually exclusively engaged to provide drive torque to the gear arrangement 20.

The gear arrangement 20 includes a plurality of gear sets, indicated generally by reference number 26, and a plurality of shafts, indicated generally by reference number 28. The plurality of gear sets 26 includes individual intermeshing gears that are connected to or selectively connectable to the plurality of shafts 28. The plurality of shafts 28 may include layshafts, countershafts, sleeve and center shafts, reverse or idle shafts, or combinations thereof. It should be appreciated that the specific arrangement and number of the gear sets 26 and the specific arrangement and number of the shafts 28 within the transmission 10 may vary without departing from the scope of the present invention. In the example provided, the transmission 10 provides seven forward gears and a reverse gear.

The gear arrangement 20 further includes a first synchronizer assembly 30A, a second synchronizer assembly 30B, a third synchronizer assembly 30C, and a fourth synchronizer assembly 30D. The synchronizer assemblies 30A-D are operable to selectively couple individual gears within the plurality of gear sets 26 to the plurality of shafts 28. Each synchronizer assembly 30A-D is disposed either adjacent certain single gears or between adjacent pairs of gears within adjacent gear sets 26. Each synchronizer assembly 30A-D, when activated, synchronizes the speed of a gear to that of a shaft and a positive clutch, such as a dog or face clutch. The clutch positively connects or couples the gear to the shaft. The clutch is bi-directionally translated by a shift rail and fork assembly (not shown) within each synchronizer assembly 30A-D.

The transmission also includes a transmission control module 32. The transmission control module 32 is preferably an electronic control device having a preprogrammed digital computer or processor, control logic, memory used to store data, and at least one I/O peripheral. The control logic includes a plurality of logic routines for monitoring, manipulating, and generating data. The transmission control module 32 controls the actuation of the dual clutch assembly 18 and the synchronizer assemblies 30A-D via a hydraulic control system 100 according to the principles of the present invention.

Figure 2A:
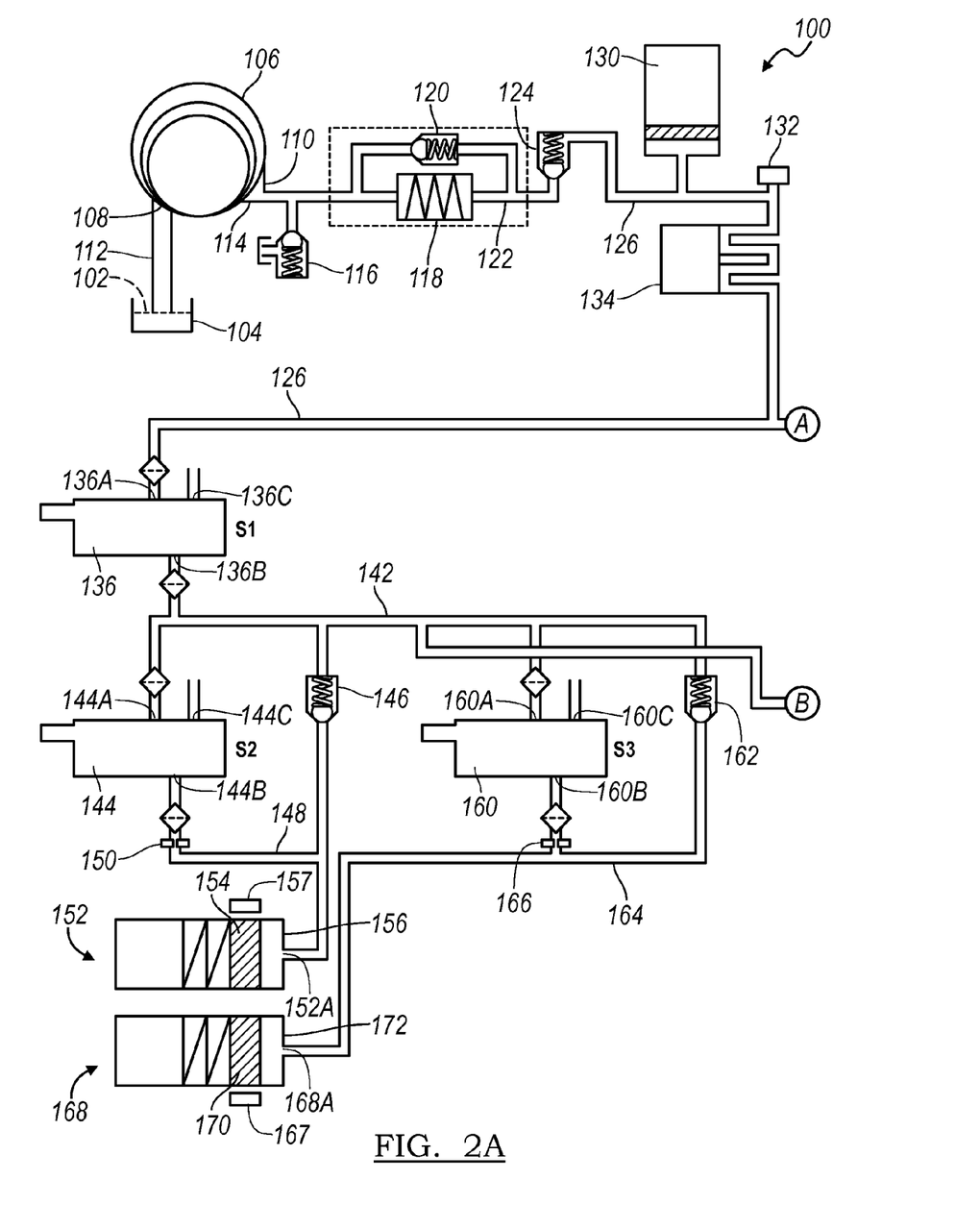
FIGS. 2A-C are schematic diagrams of an embodiment of a hydraulic control system for a dual clutch transmission according to the principles of the present invention.
Figure 2B:
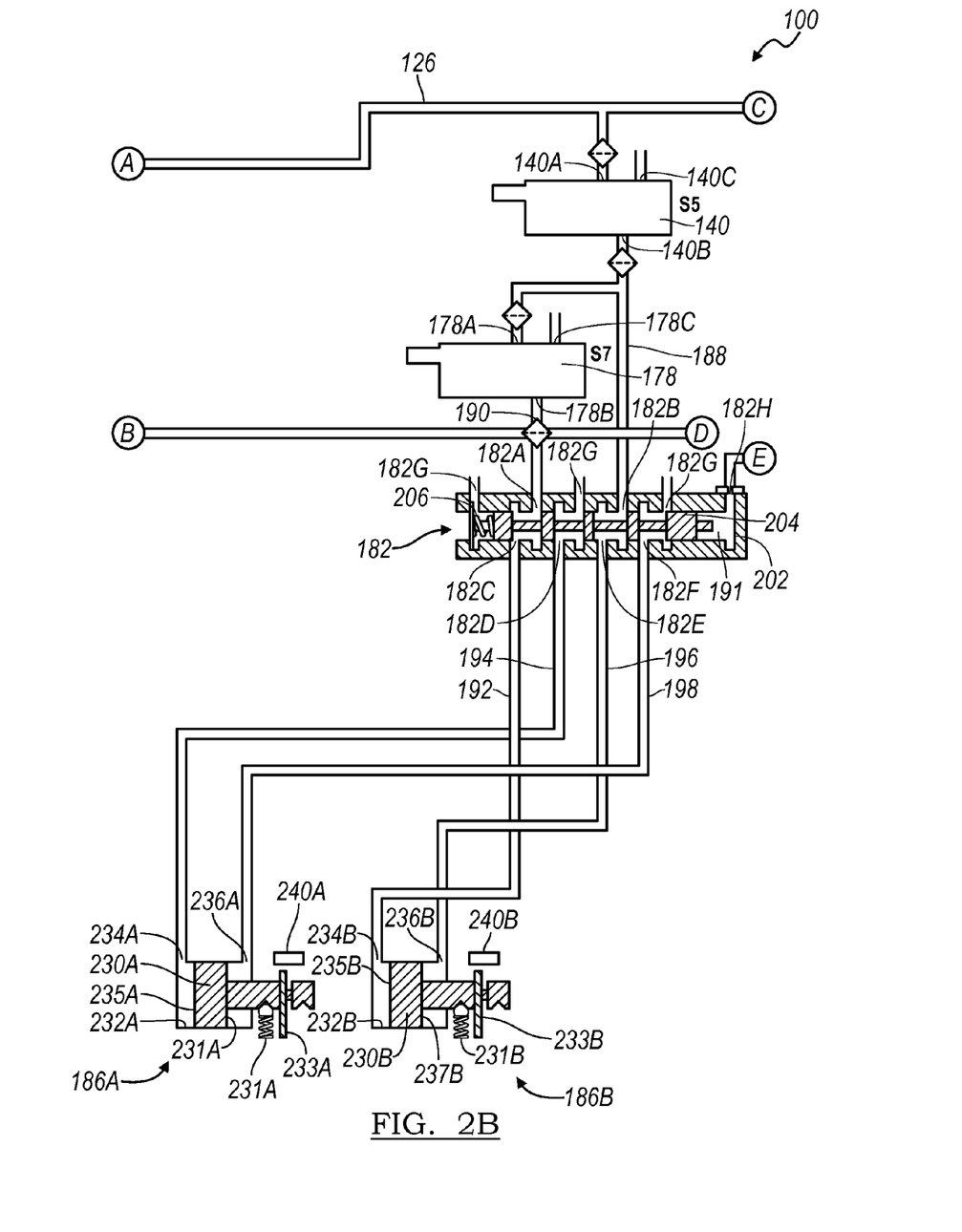
Figure 2C:
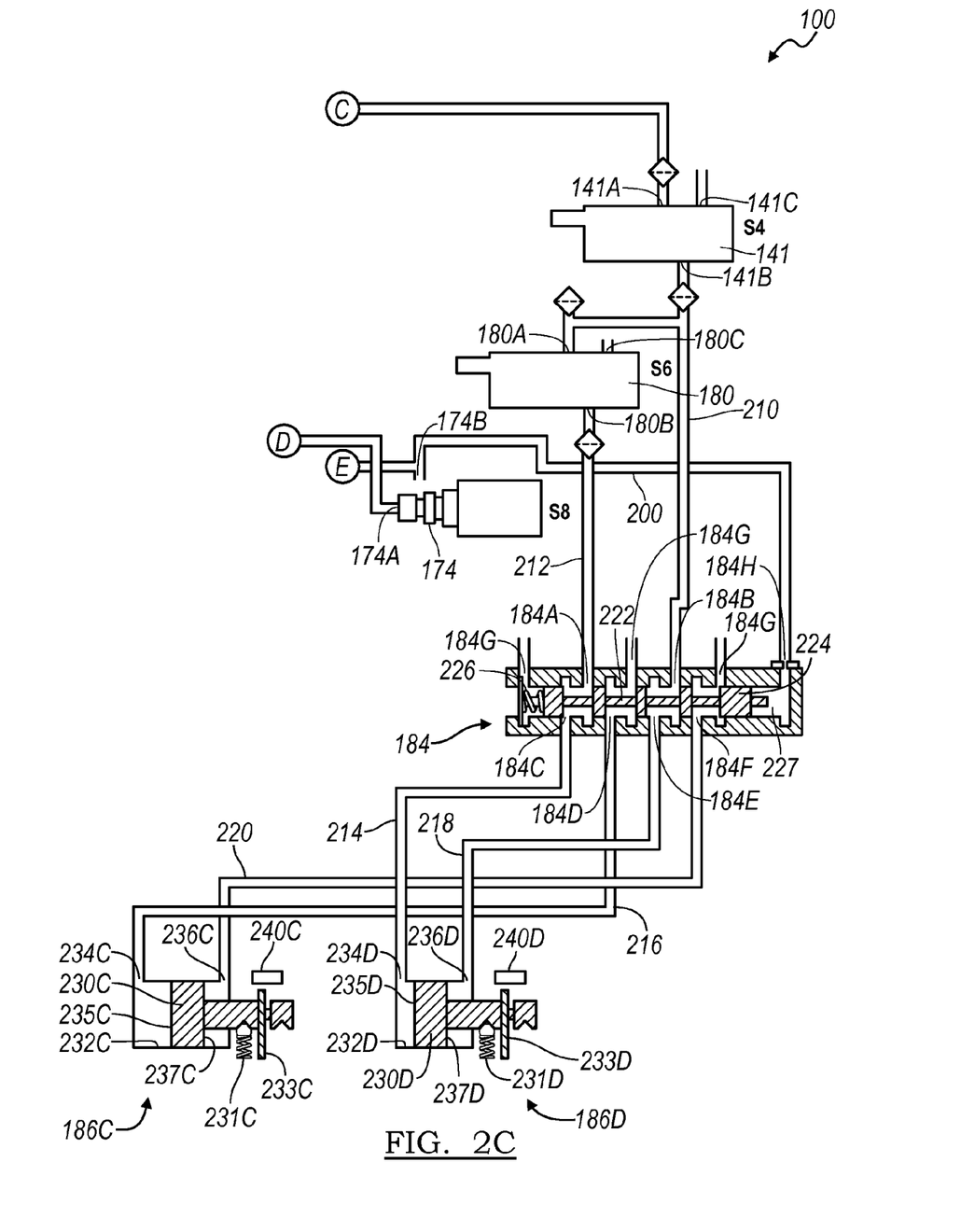

Turning to FIGS. 2A-C, the hydraulic control system 100 is operable to selectively engage the dual clutch assembly 18 and the synchronizer assemblies 30A-D by selectively communicating a hydraulic fluid 102 from a sump 104 to a plurality of shift actuating devices, as will be described in greater detail below. The sump 104 is a tank or reservoir preferably disposed at the bottom of the transmission housing 12 to which the hydraulic fluid 102 returns and collects from various components and regions of the automatic transmission 10. The hydraulic fluid 102 is forced from the sump 104 via a pump 106. The pump 106 is driven by an electric motor or combustion engine (not shown) or any other type of prime mover. The pump 106 may be, for example, a gear pump, a vane pump, a gerotor pump, or any other positive displacement pump. The pump 106 includes an inlet port 108 and an outlet port 110. The inlet port 108 communicates with the sump 104 via a suction line 112. The outlet port 110 communicates pressurized hydraulic fluid 102 to a supply line 114. The supply line 114 is in communication with a spring biased blow-off safety valve 116, a pressure side filter 118, and a spring biased check valve 120. The spring biased blow-off safety valve 116 communicates with the sump 104. The spring biased blow-off safety valve 116 is set at a relatively high predetermined pressure and if the pressure of the hydraulic fluid 102 in the supply line 114 exceeds this pressure, the safety valve 116 opens momentarily to relieve and reduce the pressure of the hydraulic fluid 102. The pressure side filter 118 is disposed in parallel with the spring biased check valve 120. If the pressure side filter 118 becomes blocked or partially blocked, pressure within supply line 114 increases and opens the spring biased check valve 120 in order to allow the hydraulic fluid 102 to bypass the pressure side filter 118.

The pressure side filter 118 and the spring biased check valve 120 each communicate with an outlet line 122. The outlet line 122 is in communication with a second check valve 124. The second check valve 124 is in communication with a main supply line 126 and is configured to maintain hydraulic pressure within the main supply line 126. The main supply line 126 supplies pressurized hydraulic fluid to an accumulator 130 and a main pressure sensor 132. The accumulator 130 is an energy storage device in which the non-compressible hydraulic fluid 102 is held under pressure by an external source. In the example provided, the accumulator 130 is a spring type or gas filled type accumulator having a spring or compressible gas that provides a compressive force on the hydraulic fluid 102 within the accumulator 130. However, it should be appreciated that the accumulator 130 may be of other types, such as a gas-charged type, without departing from the scope of the present invention. Accordingly, the accumulator 130 is operable to supply pressurized hydraulic fluid 102 back to the main supply line 126. However, upon discharge of the accumulator 130, the second check valve 124 prevents the pressurized hydraulic fluid 102 from returning to the pump 106. The accumulator 130, when charged, effectively replaces the pump 106 as the source of pressurized hydraulic fluid 102, thereby eliminating the need for the pump 106 to run continuously. The main pressure sensor 132 reads the pressure of the hydraulic fluid 102 within the main supply line 126 in real time and provides this data to the transmission control module 32. Accordingly, the transmission control module 32 can operate the pump 106 based on real-time conditions of the accumulator 130.

The main supply line 126 is channeled through a heat sink 134 used to cool the controller 32, though it should be appreciated that the heat sink 134 may be located elsewhere or removed from the hydraulic control system 100 without departing from the scope of the present invention. The main supply line 126 supplies pressurized hydraulic fluid 102 to three pressure control devices including a clutch pressure control device 136, a first actuator pressure control device 140, and a second actuator pressure control device 141.

The clutch pressure control device 136 is preferably an electrically controlled variable force solenoid having an internal closed loop pressure control. Various makes, types, and models of solenoids may be employed with the present invention so long as the clutch pressure control device 136 is operable to control the pressure of the hydraulic fluid 102. The clutch pressure control device 136 includes an inlet port 136A that communicates with an outlet port 136B when the clutch pressure control device 136 is activated or energized and includes an exhaust port 136C that communicates with the outlet port 136B when the clutch pressure control device 136 is inactive or de-energized. Variable activation of the clutch pressure control device 136 regulates or controls the pressure of the hydraulic fluid 102 as the hydraulic fluid 102 communicates from the inlet port 136A to the outlet port 136B. The internal closed loop pressure control provides pressure feedback within the solenoid to adjust the amount of flow to the outlet port 136B based on a particular current command from the controller 32, thereby controlling pressure. The inlet port 136A is in communication with the main supply line 126. The outlet port 136B is in communication with an intermediate line 142. The exhaust port 136C is in communication with the sump 104, or an exhaust backfill circuit (not shown).

The intermediate line 142 communicates the hydraulic fluid 102 from the clutch pressure control device 136 to a first clutch flow control device 144, to a first pressure limit control valve 146, to a second clutch flow control device 160, to a second pressure limit control valve 162, and to mode valve control solenoid 174. The first clutch flow control device 144 is preferably an electrically controlled variable force solenoid that is operable to control a flow of the hydraulic fluid 102 from the first clutch flow control device 144 in order to actuate the first torque transmitting device 22, as will be described in greater detail below. The first clutch flow control device 144 includes an inlet port 144A that communicates with an outlet port 144B when the first clutch flow control device 144 is energized to a current greater than a null point current (i.e., the zero forward/reverse flow point for the given current) and includes an exhaust port 144C that communicates with the outlet port 144B when the first clutch flow control device 144 is de-energized to a current less than the null point current. Variable activation of the first clutch flow control device 144 regulates or controls the flow of the hydraulic fluid 102 as the hydraulic fluid 102 communicates from the inlet port 144A to the outlet port 144B. The inlet port 144A is in communication with the intermediate line 142. The outlet port 144B is in communication with a first clutch supply line 148 and a flow restriction orifice 150. The exhaust port 144C is in communication with the sump 104 or an exhaust backfill circuit (not shown). The first pressure limit control valve 146 is disposed in parallel with the first clutch flow control solenoid 144 and is in communication with the first clutch supply line 148. If pressure within the first clutch supply line 148 exceeds a predetermined value, the first pressure limit control valve 146 opens to relieve and reduce the pressure.

The first clutch supply line 148 is in fluid communication with an inlet/outlet port 152A in a first clutch piston assembly 152. The first clutch piston assembly 152 includes a single acting piston 154 slidably disposed in a cylinder 156. The piston 154 translates under hydraulic pressure to engage the first torque transmitting device 22, shown in FIG. 1. When the first clutch flow control device 144 is activated or energized above the null point, a flow of pressurized hydraulic fluid 102 is provided to the first clutch supply line 148. The flow of pressurized hydraulic fluid 102 is communicated from the first clutch supply line 148 to the first clutch piston assembly 152 where the pressurized hydraulic fluid 102 translates the piston 154, thereby engaging the first torque transmitting device 22. When the first clutch flow control solenoid 144 is de-energized below the null point, the inlet port 144A is closed and hydraulic fluid from the cylinder 156 passes from the outlet port 144B to the exhaust port 144C and into the sump 104 or an exhaust backfill circuit (not shown), thereby disengaging the first torque transmitting device 22. The translation of the piston 154 is monitored by a position sensor 157.

The second clutch flow control device 160 is preferably an electrically controlled variable force solenoid that is operable to control a flow of the hydraulic fluid 102 from the second clutch flow control device 160 in order to actuate the second torque transmitting device 24, as will be described in greater detail below. The second clutch flow control device 160 includes an inlet port 160A that communicates with an outlet port 160B when the second clutch flow control device 160 is energized to a current greater than the null point current and includes an exhaust port 160C that communicates with the outlet port 160B when the second clutch flow control device 160 is de-energized below the null point current. Variable activation of the second clutch flow control device 160 regulates or controls the flow of the hydraulic fluid 102 as the hydraulic fluid 102 communicates from the inlet port 160A to the outlet port 160B. The inlet port 160A is in communication with the intermediate line 142. The outlet port 160B is in communication with a second clutch supply line 164 and a flow restriction orifice 166. The exhaust port 160C is in communication with the sump 104 or an exhaust backfill circuit (not shown). The second pressure limit control valve 162 is disposed in parallel with the second clutch flow control solenoid 160 and is in communication with the second clutch supply line 164. If pressure within the second clutch supply line 164 exceeds a predetermined value, the second pressure limit control valve 162 opens to relieve and reduce the pressure. The translation of the piston 170 is monitored by a position sensor 167.

The second clutch supply line 164 is in fluid communication with an inlet/outlet port 168A in a second clutch piston assembly 168. The second clutch piston assembly 168 includes a single acting piston 170 slidably disposed in a cylinder 172. The piston 170 translates under hydraulic pressure to engage the second torque transmitting device 24, shown in FIG. 1. When the second clutch flow control device 160 is activated or energized to a current greater than the null point, a flow of pressurized hydraulic fluid 102 is provided to the second clutch supply line 166. The flow of pressurized hydraulic fluid 102 is communicated from the second clutch supply line 166 to the second clutch piston assembly 168 where the pressurized hydraulic fluid 102 translates the piston 170, thereby engaging the second torque transmitting device 24. When the second clutch flow control solenoid 160 is de-energized a current less than the null point, the inlet port 160A is closed and hydraulic fluid from the cylinder 172 passes from the outlet port 160B to the exhaust port 160C and into the sump 104, thereby disengaging the second torque transmitting device 24.

The first and second actuator pressure control devices 140 and 141 are operable to selectively provide flows of pressurized hydraulic fluid 102 through first and second actuator flow control devices 178, 180 and through first and second valve assemblies 182, 184 in order to selectively actuate a plurality of synchronizer shift actuators. The synchronizer actuators include a first synchronizer actuator 186A, a second synchronizer actuator 186B, a third synchronizer actuator 186C, and a fourth synchronizer actuator 186D.

For example, the first actuator pressure control device 140 is preferably an electrically controlled variable force solenoid having an internal closed loop pressure control. Various makes, types, and models of solenoids may be employed with the present invention so long as the first actuator pressure control device 140 is operable to control the pressure of the hydraulic fluid 102. The first actuator pressure control device 140 includes an inlet port 140A that communicates with an outlet port 140B when the first actuator pressure control device 140 is activated or energized and includes an exhaust port 140C that communicates with the outlet port 140B when the first actuator pressure control device 140 is inactive or de-energized. Variable activation of the first actuator pressure control device 140 regulates or controls the pressure of the hydraulic fluid 102 as the hydraulic fluid 102 communicates from the inlet port 140A to the outlet port 140B. The internal closed loop pressure control provides pressure feedback within the solenoid to adjust the amount of flow to the outlet port 140B based on a particular current command from the controller 32, thereby controlling pressure. The inlet port 140A is in communication with the main supply line 126. The outlet port 140B is in communication with an intermediate line 188. The exhaust port 140C is in communication with the sump 104 or an exhaust backfill circuit (not shown).

The intermediate line 188 communicates pressurized hydraulic fluid 102 from the first actuator pressure control device 140 to a first flow control device 178 and the first valve assembly 182. The first flow control device 178 is preferably an electrically controlled variable force solenoid. Various makes, types, and models of solenoids may be employed with the present invention so long as the first flow control device 178 is operable to control the flow of the hydraulic fluid 102. The first flow control device 178 includes an inlet port 178A that communicates through an adjustable hydraulic orifice or restriction with an outlet port 178B when the first flow control device 178 energized to a current greater than the null point current and includes an exhaust port 178C that communicates with the outlet port 178B when the first flow control device 178 is de-energized to a current less than the null point current. Variable activation of the first flow control device 178 regulates or controls the flow of the hydraulic fluid 102 as the hydraulic fluid 102 communicates from the inlet port 178A to the outlet port 178B and from outlet port 178B to exhaust port 178C. The inlet port 178A is in communication with the intermediate line 188. The outlet port 178B is in communication with an intermediate line 190 which communicates with the first valve assembly 182. The exhaust port 178C is in communication with the sump 104 or an exhaust backfill circuit (not shown).

The first valve assembly 182 is operable to selectively direct the pressurized hydraulic fluid 102 flows from the first pressure control device 140 and the first actuator flow control device 178 to the first synchronizer actuator 186A and to the second synchronizer actuator 186B, as will be described in greater detail below. The first valve assembly 182 includes a first inlet port 182A, a second inlet port 182B, a first outlet port 182C, a second outlet port 182D, a third outlet port 182E, a fourth outlet port 182F, a plurality of exhaust ports 182G, and a control port 182H. The first inlet port 182A is in communication with the intermediate line 190. The second inlet port 182B is in communication with the intermediate line 188. The first outlet port 182C is in communication with a synchronizer supply line 192. The second outlet port 182D is in communication with a synchronizer supply line 194. The third outlet port 182E is in communication with a synchronizer supply line 196. The fourth outlet port 182F is in communication with a synchronizer supply line 198. The exhaust ports 182G are in ultimately in communication with the sump 104 or an exhaust backfill circuit (not shown). The control port 182H is in communication with a control line 200 that communicates with the control device 174. The valve control device 174 is preferably an on-off solenoid that is normally closed. However, it should be appreciated that other types of solenoids and other control devices may be employed without departing from the scope of the present invention, such as pressure control solenoids.

The first valve assembly 182 further includes a valve spool 202 slidably disposed within a valve body or bore 204. The valve spool 202 is moveable between at least two positions by a biasing member 206 and by fluid flow channeled from the control device 174 via control line 200. The biasing member 206 is preferably a spring and acts on an end of the valve spool 202 to bias the valve spool 202 to the first position or de-stroked position. When the control device 174 is energized or activated a flow of the hydraulic fluid 102 is communicated to the control port 182H via control line 200 and into a control chamber 191 of valve assembly 182. The hydraulic fluid 102 acts on an end of the valve spool 202 to move the valve spool 202 and compress biasing member 206 to place valve spool 202 in the second position or stroked position. A supply of pressurized hydraulic fluid is provided to the control device 174 via intermediate fluid line 142 when the clutch pressure control device 136 is energized or opened.

When the valve spool 202 is in the de-stroked position, the first inlet port 182A is in communication with the second outlet port 182D, the second inlet port 182B is in communication with the fourth outlet port 182F, and the first and third outlet ports 182C, 182E are in communication with the exhaust ports 182G. When the valve spool 202 is in the stroked position, as shown in FIG. 2B, the first inlet port 182A is in communication with the first outlet port 182C, the second inlet port 182B is in communication with the third outlet port 182E, and the second and fourth outlet ports 182D, 182F are in communication with the exhaust ports 182G. Accordingly, when the valve control device 174 is opened, pressurized hydraulic fluid 102 flows from the first pressure control device 140 and a variable flow of hydraulic fluid 102 flows from the first flow control device 178 to the second synchronizer actuator 186B. When the valve control device 174 is closed, pressurized hydraulic fluid 102 flows from the first pressure control device 140 and a variable flow of hydraulic fluid 102 flows from the first flow control device 178 to the first synchronizer actuator 186A.

The second actuator pressure control device 141 is preferably an electrically controlled variable force solenoid having an internal closed loop pressure control. Various makes, types, and models of solenoids may be employed with the present invention so long as the second actuator pressure control device 141 is operable to control the pressure of the hydraulic fluid 102. The second actuator pressure control device 141 includes an inlet port 141A that communicates with an outlet port 141B when the second actuator pressure control device 141 is activated or energized and includes an exhaust port 141C that communicates with the outlet port 141B when the second actuator pressure control device 141 is inactive or de-energized. Variable activation of the second actuator pressure control device 141 regulates or controls the pressure of the hydraulic fluid 102 as the hydraulic fluid 102 communicates from the inlet port 141A to the outlet port 141B. The internal closed loop pressure control provides pressure feedback within the solenoid to adjust the amount of flow to the outlet port 141B based on a particular current command from the controller 32, thereby controlling pressure. The inlet port 141A is in communication with the main supply line 126. The outlet port 141B is in communication with an intermediate line 210. The exhaust port 141C is in communication with the sump 104 or an exhaust backfill circuit (not shown).

The intermediate line 210 communicates pressurized hydraulic fluid 102 from the second actuator pressure control device 141 to the second flow control device 180 and the second valve assembly 184. The second flow control device 180 is preferably an electrically controlled variable force solenoid. Various makes, types, and models of solenoids may be employed with the present invention so long as the second flow control device 180 is operable to control the flow of the hydraulic fluid 102. The second flow control device 180 includes an inlet port 180A that communicates through an adjustable hydraulic orifice or restriction with an outlet port 180B when the second flow control device 180 is energized to a current above the null point current and includes an exhaust port 180C that communicates with the outlet port 180B when the second flow control device 180 is de-energized below the null point current. Variable activation of the second flow control device 180 regulates or controls the flow of the hydraulic fluid 102 as the hydraulic fluid 102 communicates from the inlet port 180A to the outlet port 180B and from outlet port 180B to exhaust port 180C. The inlet port 180A is in communication with the intermediate line 210. The outlet port 180B is in communication with an intermediate line 212 which communicates with the second valve assembly 184. The exhaust port 180C is in communication with the sump 104.

The second valve assembly 184 is operable to selectively direct the pressurized hydraulic fluid 102 flows from the second pressure control device 141 and the second actuator flow control device 180 to the third synchronizer actuator 186C and to the fourth synchronizer actuator 186D, as will be described in greater detail below. The second valve assembly 184 includes a first inlet port 184A, a second inlet port 184B, a first outlet port 184C, a second outlet port 184D, a third outlet port 184E, a fourth outlet port 184F, a plurality of exhaust ports 184G, and a control port 184H. The first inlet port 184A is in communication with the intermediate line 212. The second inlet port 184B is in communication with the intermediate line 210. The first outlet port 184C is in communication with a synchronizer supply line 214. The second outlet port 184D is in communication with a synchronizer supply line 216. The third outlet port 184E is in communication with a synchronizer supply line 218. The fourth outlet port 184F is in communication with a synchronizer supply line 220. The exhaust ports 184G are in communication with the sump 104 or an exhaust backfill circuit (not shown). The control port 184H is in communication with the control line 200 that communicates with the control device 174.

The second valve assembly 184 further includes a valve spool 222 slidably disposed within a valve body or bore 224. The valve spool 222 is moveable between at least two positions by a biasing member 226 and by fluid flow channeled from the control device 174 via control line 200. The biasing member 226 is preferably a spring and acts on an end of the valve spool 222 to bias the valve spool 222 to the first position or de-stroked position. When the control device 174 is energized or activated a flow of the hydraulic fluid 102 is communicated to the control port 184H via control line 200 and into a control chamber 227 of valve assembly 184. The hydraulic fluid 102 acts on an end of the valve spool 222 to move the valve spool 222 and compress biasing member 226 to place valve spool 222 in the second position or stroked position.

When the valve 222 is in the de-stroked position, the first inlet port 184A is in communication with the second outlet port 184D, the second inlet port 184B is in communication with the fourth outlet port 184F, and the first and third outlet ports 184C, 184E are in communication with the exhaust ports 184G. When the valve 222 is in the stroked position, as shown in FIG. 2C, the first inlet port 184A is in communication with the first outlet port 184C, the second inlet port 184B is in communication with the third outlet port 184E, and the second and fourth outlet ports 184D, 184F are in communication with the exhaust ports 184G. Accordingly, when the valve control device 174 is opened, pressurized hydraulic fluid 102 flows from the second pressure control device 141 and a variable flow of hydraulic fluid 102 flows from the second flow control device 180 to the fourth synchronizer actuator 186D. When the valve control device 174 is closed, pressurized hydraulic fluid 102 flows from the second pressure control device 141 and a variable flow of hydraulic fluid 102 flows from the second flow control device 180 to the third synchronizer actuator 186C.

The synchronizer actuators 186A-D are preferably two-area piston assemblies operable to each engage or actuate a shift rail in a synchronizer assembly, but can be three-area piston assemblies without departing from the scope of the present invention. For example, the first synchronizer actuator 186A is operable to actuate the first synchronizer assembly 30A, the second synchronizer actuator 186B is operable to actuate the second synchronizer assembly 30B, the third synchronizer actuator 186C is operable to actuate the third synchronizer assembly 30C, and the fourth synchronizer actuator 186D is operable to actuate the fourth synchronizer assembly 30D.

The first synchronizer actuator 186A includes a piston 230A slidably disposed within a piston housing or cylinder 232A. A detent spring 231A biases the piston 230A in a first engaged position, a second engaged position and in a neutral position. The piston 230A presents two separate areas for pressurized hydraulic fluid to act upon. The piston 230A engages or contacts a finger lever, shift fork, or other shift rail component 233A of the first synchronizer assembly 30A. The first synchronizer actuator 186A includes a fluid port 234A that communicates with a first end 235A of the piston 230A and a fluid port 236A that communicates with an opposite second end 237A of the piston 230A having a smaller contact area than the first end 235A. Fluid port 234A is in communication with the synchronizer supply line 194 and fluid port 236A is in communication with the synchronizer supply line 198. Accordingly, the pressurized hydraulic fluid 102 communicated from the first actuator pressure control device 140 enters the first synchronizer actuator 186A through the fluid port 236A and contacts the second end 237A of the piston 230A and the flow of hydraulic fluid 102 from the first flow control device 178 enters the first synchronizer actuator 186A through the fluid port 234A and contacts the first end 235A of the piston 230A. The difference in the force generated by the pressure of the hydraulic fluid 102 delivered to fluid port 236A from the first actuator pressure control device 140 and the hydraulic fluid 102 delivered to fluid port 234A from the first flow control device 178 moves the piston 230A between various positions. By controlling the flow of hydraulic fluid 102 from the first flow control device 178, the piston 234A is actuated between the various positions. Each position in turn corresponds to a position of the shift rail of the first synchronizer assembly 30A (i.e., engaged left, engaged right, and neutral). A fork position sensor 240A may be included to communicate to the controller 32 the position of the shift fork 233A.

The second synchronizer actuator 186B includes a piston 230B slidably disposed within a piston housing or cylinder 232B. A detent spring 231B biases the piston 230B in a first engaged position, a second engaged position and in a neutral position. The piston 230B presents two separate areas for pressurized hydraulic fluid to act upon. The piston 230B engages or contacts a finger lever, shift fork, or other shift rail component 233B of the second synchronizer assembly 30B. The second synchronizer actuator 186B includes a fluid port 234B that communicates with a first end 235B of the piston 230B and a fluid port 236B that communicates with an opposite second end 237B of the piston 230B having a smaller contact area than the first end 235B. Fluid port 234B is in communication with the synchronizer supply line 192 and fluid port 236B is in communication with the synchronizer supply line 196. Accordingly, the pressurized hydraulic fluid 102 communicated from the first actuator pressure control device 140 enters the second synchronizer actuator 186B through the fluid port 236B and contacts the second end 237B of the piston 230B and the flow of hydraulic fluid 102 from the first flow control device 178 enters the second synchronizer actuator 186B through the fluid port 234B and contacts the first end 235B of the piston 230B. The difference in the force generated by the pressure of the hydraulic fluid 102 delivered to fluid port 236B from the first actuator pressure control device 140 and the hydraulic fluid 102 delivered to fluid port 234B from the first flow control device 178 moves the piston 230B between various positions. By controlling the flow of hydraulic fluid 102 from the first flow control device 178, the piston 230B is actuated between the various positions. Each position in turn corresponds to a position of the shift rail of the second synchronizer assembly 30B (i.e., engaged left, engaged right, and neutral). A fork position sensor 240B may be included to communicate to the controller 32 the position of the shift fork 233B.

The third synchronizer actuator 186C includes a piston 230C slidably disposed within a piston housing or cylinder 232C. A detent spring 231C biases the piston 230C in a first engaged position, a second engaged position and in a neutral position. The piston 230C presents two separate areas for pressurized hydraulic fluid to act upon. The piston 230C engages or contacts a finger lever, shift fork, or other shift rail component 233C of the third synchronizer assembly 30C.

The third synchronizer actuator 186C includes a fluid port 234C that communicates with a first end 235C of the piston 230C and a fluid port 236C that communicates with an opposite second end 237C of the piston 230C having a smaller contact area than the first end 235C. Fluid port 234C is in communication with the synchronizer supply line 216 and fluid port 236C is in communication with the synchronizer supply line 220. Accordingly, the pressurized hydraulic fluid 102 communicated from the second actuator pressure control device 141 enters the third synchronizer actuator 186C through the fluid port 236C and contacts the second end 237C of the piston 230C and the flow of hydraulic fluid 102 from the second flow control device 180 enters the third synchronizer actuator 186C through the fluid port 234C and contacts the first end 235C of the piston 230C. The difference in the force generated by the pressure of the hydraulic fluid 102 delivered to fluid port 236C from the second actuator pressure control device 141 and the hydraulic fluid 102 delivered to fluid port 234C from the second flow control device 180 moves the piston 230C between various positions. By controlling the flow of hydraulic fluid 102 from the second flow control device 180, the piston 234C is actuated between the various positions. Each position in turn corresponds to a position of the shift rail of the third synchronizer assembly 30C (i.e., engaged left, engaged right, and neutral). A fork position sensor 240C may be included to communicate to the controller 32 the position of the shift fork 233C.

The fourth synchronizer actuator 186D includes a piston 230D slidably disposed within a piston housing or cylinder 232D. A detent spring 231D biases the piston 230D in a first engaged position, a second engaged position and in a neutral position. The piston 230D presents two separate areas for pressurized hydraulic fluid to act upon. The piston 230D engages or contacts a finger lever, shift fork, or other shift rail component 233D of the fourth synchronizer assembly 30D. The fourth synchronizer actuator 186D includes a fluid port 234D that communicates with a first end 235D of the piston 230D and a fluid port 236D that communicates with an opposite second end 237D of the piston 230D having a smaller contact area than the first end 235D. Fluid port 234D is in communication with the synchronizer supply line 214 and fluid port 236D is in communication with the synchronizer supply line 218. Accordingly, the pressurized hydraulic fluid 102 communicated from the second actuator pressure control device 141 enters the fourth synchronizer actuator 186D through the fluid port 236D and contacts the second end 237D of the piston 230D and the flow of hydraulic fluid 102 from the second flow control device 180 enters the fourth synchronizer actuator 186D through the fluid port 234D and contacts the first end 235D of the piston 230D. The difference in the force generated by the pressure of the hydraulic fluid 102 delivered to fluid port 236D from the second actuator pressure control device 141 and the hydraulic fluid 102 delivered to fluid port 234D from the second flow control device 180 moves the piston 230D between various positions. By controlling the flow of hydraulic fluid 102 from the second flow control device 180, the piston 234D is actuated between the various positions. Each position in turn corresponds to a position of the shift rail of the fourth synchronizer assembly 30D (i.e., engaged left, engaged right, and neutral). A fork position sensor 240D may be included to communicate to the controller 32 the position of the shift fork 233D.

During general operation of the hydraulic control system 100, the accumulator 130 provides the pressurized hydraulic fluid 102 throughout the system and the pump 106 is employed to charge the accumulator 130. Selection of a particular forward or reverse gear ratio is achieved by first selectively actuating one of the synchronizer assemblies 30A-D and then selectively actuating one of the torque transmitting devices 22, 24. It should be appreciated that the combination of selective engagement of the actuator assemblies 30A-D and torque transmitting devices 22, 24 providing a forward or reverse gear ratio may vary without departing from the scope of the present invention.

Generally, the first actuator pressure control device 140 selectively provides pressurized hydraulic fluid 102 to each of the synchronizer actuators 186A-B and the first flow control device 178 and the second actuator pressure control device 141 selectively provides pressurized hydraulic fluid 102 to each of the synchronizer actuators 186C-D and the second flow control device 180. Individual synchronizer actuators 186A-D are actuated by controlling a flow from one of the flow control devices 178 and 180 based upon positioning of the first and second valve assemblies 182 and 184.

For example, to actuate the first synchronizer assembly 30A, the first pressure control device 140 is energized to provide a pressure on the piston 230A and to provide a flow of pressurized hydraulic fluid 102 to the first flow control device 178. Bi-directional translation of the first synchronizer assembly 30A is then achieved by selectively energizing the first flow control device 178. To actuate the second synchronizer assembly 30B, the first pressure control device 140 is energized to provide a pressure force on the piston 230B and to provide a flow of pressurized hydraulic fluid 102 to the first flow control device 178. Bi-directional translation of the second synchronizer assembly 30B is then achieved by selectively energizing the first flow control device 178.

To actuate the third synchronizer assembly 30C, the second pressure control device 141 is energized to provide a pressure force on the piston 230C and to provide a flow of pressurized hydraulic fluid 102 to the second flow control device 180. Bi-directional translation of the third synchronizer assembly 30C is then achieved by selectively energizing the second flow control device 180.

To actuate the fourth synchronizer assembly 30D, the second pressure control device 141 is energized to provide a pressure force on the piston 230D and to provide a flow of pressurized hydraulic fluid 102 to the second flow control device 180. Bi-directional translation of the third synchronizer assembly 30D is then achieved by selectively energizing the second flow control device 180.

To engage or actuate the first torque transmitting device 22, the clutch pressure control device 136 and the first clutch flow control device 144 is energized or opened. To engage or actuate the second torque transmitting device 24, the clutch pressure control device 136 and the second clutch flow control device 160 are energized or opened.

By providing flow control of the clutches 22 and 24 and/or the synchronizer assemblies 30A-D, the hydraulic control system 100 is operable to provide direct clutch position control, direct synchronizer actuator position control, and variable clutch and synchronizer actuator position control. At the same time, quick clutch response times are enabled, spin losses are reduced, and packaging space of the hydraulic control system 100 is reduced, all of which contributes to improved fuel economy and performance. The hydraulic control system 100 is also compatible with BAS/BAS+ hybrid systems. Finally, failure mode protection is enabled through pre-staged position control of the control devices 136, 140, 141, 144, 160, 178, 180, and the valves 182 and 184.

The description of the invention is merely exemplary in nature and variations that do not depart from the general essence of the invention are intended to be within the scope of The following is claimed:

1. A hydraulic control system for controlling a dual clutch transmission having a plurality of synchronizers, the hydraulic control system comprising:
   a source for providing a pressurized hydraulic fluid;
   a first, a second, and a third pressure control solenoid in downstream fluid communication with the source;
   a first flow control solenoid in downstream fluid communication with the first pressure control solenoid;
   a second flow control solenoid in downstream fluid communication with the first pressure control solenoid;
   a first clutch actuator in downstream fluid communication with the first flow control solenoid for selectively actuating a first clutch of the dual clutch transmission;
   a second clutch actuator in downstream fluid communication with the second flow control solenoid for selectively actuating a second clutch of the dual clutch transmission;
   a third flow control solenoid in downstream fluid communication with the second pressure control solenoid;
   a fourth flow control solenoid in downstream fluid communication with the third pressure control solenoid;
   a first logic valve assembly in downstream direct fluid communication with the third flow control solenoid and the second pressure control solenoid, wherein the first logic control valve assembly has a valve spool movable between a first and a second position;
   a second logic valve assembly in downstream direct fluid communication with the fourth flow control solenoid and the third pressure control solenoid, wherein the second logic control valve assembly has a valve spool movable between a first and a second position;
   a first actuator in downstream fluid communication with the first logic valve assembly, wherein the first actuator is movable between a first, second and third position to selectively engage or disengage a first of the plurality of synchronizers when the valve spool of the first logic control valve assembly is in the first position;
   a second actuator in downstream fluid communication with the first logic valve assembly, wherein the second actuator is movable between a first, second and third position to selectively engage or disengage a second of the plurality of synchronizers when the valve spool of the first logic control valve assembly is in the second position;
   a third actuator in downstream fluid communication with the second logic valve assembly, wherein the third actuator is movable between a first, second and third position to selectively engage or disengage a third of the plurality of synchronizers when the valve spool of the second logic control valve assembly is in the first position; and
   a fourth actuator in downstream fluid communication with the second logic valve assembly, wherein the fourth actuator is movable between a first, second and third position to selectively engage or disengage a fourth of the plurality of synchronizers when the valve spool of the second logic control valve assembly is in the second position, and
   wherein the second pressure control solenoid generates a first hydraulic fluid pressure and the third flow control solenoid varies hydraulic fluid flow to at least one of the first and second actuators to move at least one of the first and second actuators into at least one of the first, second, and third positions and wherein the third pressure control solenoid generates a second hydraulic fluid pressure and the fourth flow control solenoid varies hydraulic fluid flow to at least one of the third and fourth actuators to move at least one of the third and fourth actuators into at least one of the first, second, and third positions.

2. The hydraulic control system of claim 1 further comprising a logic valve control solenoid in downstream fluid communication with the first pressure control solenoid and in upstream fluid communication with the first and second logic valve assemblies.

3. The hydraulic control system of claim 2 wherein the logic valve control solenoid is configured to communicate a third pressurized hydraulic fluid from the first pressure control solenoid to the first and second logic valve assemblies in order to move each of the valve spools of the first and second logic valve assemblies to the second positions.

4. A hydraulic control system for controlling a dual clutch transmission and a plurality of synchronizers in a transmission, the hydraulic control system comprising:
   a source for providing a pressurized hydraulic fluid;
   a first, a second, and a third pressure control solenoid each having an inlet port in downstream fluid communication with the source and each having an outlet port;
   a first flow control solenoid having an inlet port in downstream fluid communication with the outlet port of the first pressure control solenoid and having an outlet port;
   a second flow control solenoid having an inlet port in downstream fluid communication with the outlet port of the first pressure control solenoid and having an outlet port;
   a first clutch actuator in downstream fluid communication with the outlet port of the first flow control solenoid, the first clutch actuator configured to selectively actuate a first clutch of the dual clutch transmission;
   a second clutch actuator in downstream fluid communication with the outlet port of the second flow control solenoid, the second clutch actuator configured to selectively actuate a second clutch of the dual clutch transmission;
   a third flow control solenoid having an inlet port in downstream fluid communication with the outlet port of the second pressure control solenoid and having an outlet port;
   a fourth flow control solenoid having an inlet port in downstream fluid communication with the outlet port of the third pressure control solenoid and having an outlet port;
   a first logic valve assembly in downstream direct fluid communication with the outlet port of the third flow control solenoid and the outlet port of the second pressure control solenoid, wherein the first logic control valve assembly has a valve spool movable between a first and a second position;
   a second logic valve assembly in downstream direct fluid communication with the outlet port of the fourth flow control solenoid and the outlet port of the third pressure control solenoid, wherein the second logic control valve assembly has a valve spool movable between a first and a second position;
   a first actuator in downstream fluid communication with the first logic valve assembly, wherein the first actuator is movable between a first, second and third position when the valve spool of the first logic control valve assembly is in the first position;
   a second actuator in downstream fluid communication with the first logic valve assembly, wherein the second actuator is movable between a first, second and third position when the valve spool of the first logic control valve assembly is in the second position;

a third actuator in downstream fluid communication with the second logic valve assembly, wherein the third actuator is movable between a first, second and third position when the valve spool of the second logic control valve assembly is in the first position; and a fourth actuator in downstream fluid communication with the second logic valve assembly, wherein the fourth actuator is movable between a first, second and third position when the valve spool of the second logic control valve assembly is in the second position, wherein the second pressure control solenoid generates a first hydraulic fluid pressure and the third flow control solenoid varies hydraulic fluid flow to at least one of the first and second actuators to move at least one of the first and second actuators into at least one of the first, second, and third positions and wherein the third pressure control solenoid generates a second hydraulic fluid pressure and the fourth flow control solenoid varies hydraulic fluid flow to at least one of the third and fourth actuators to move at least one of the third and fourth actuators into at least one of the first, second, and third positions, wherein each of the first, second, third, and fourth actuators is configured to position a synchronizer between at least an engaged position and a neutral position and wherein the first and second positions of each of the first, second, third, and fourth actuators corresponds to one of the neutral and engaged positions of the synchronizer.

5. The hydraulic control system of claim 4 further comprising a logic valve control solenoid in downstream fluid communication with the outlet port of the first pressure control solenoid and in upstream fluid communication with the first and second logic valve assemblies.

6. The hydraulic control system of claim 5 wherein the logic valve control solenoid is configured to communicate a third pressurized hydraulic fluid from the first pressure control solenoid to the first and second logic valve assemblies in order to move each of the valve spools of the first and second logic valve assemblies to the second positions.

7. The hydraulic control system of claim 4 wherein the first, second, third, and fourth actuators are moved between their first and second positions by moving the valve spools of the first and second logic valve assemblies and varying the first and second flows of hydraulic fluid to either overcome or not overcome a force generated by each of the first and second pressurized hydraulic fluids acting on each of the first, second, third, and fourth actuators.

8. The hydraulic control system of claim 4 wherein the source includes a pump and an accumulator.

9. A hydraulic control system for controlling a dual clutch transmission and a plurality of synchronizers in a transmission, the hydraulic control system comprising:

a source for providing a pressurized hydraulic fluid;

a first, a second, and a third pressure control solenoid each having an inlet port in downstream fluid communication with the source and each having an outlet port;

a first flow control solenoid having an inlet port in downstream fluid communication with the outlet port of the first pressure control solenoid and having an outlet port;

a second flow control solenoid having an inlet port in downstream fluid communication with the outlet port of the first pressure control solenoid and having an outlet port;

a first clutch actuator in downstream fluid communication with the outlet port of the first flow control solenoid, the first clutch actuator configured to selectively actuate a first clutch of the dual clutch transmission;

a second clutch actuator in downstream fluid communication with the outlet port of the second flow control solenoid, the second clutch actuator configured to selectively actuate a second clutch of the dual clutch transmission;

a third flow control solenoid having an inlet port in downstream fluid communication with the outlet port of the second pressure control solenoid and having an outlet port;

a fourth flow control solenoid having an inlet port in downstream fluid communication with the outlet port of the third pressure control solenoid and having an outlet port;

a first logic valve assembly in downstream direct fluid communication with the outlet port of the third flow control solenoid and the outlet port of the second pressure control solenoid, wherein the first logic control valve assembly has a valve spool movable between a first and a second position;

a second logic valve assembly in downstream direct fluid communication with the outlet port of the fourth flow control solenoid and the outlet port of the third pressure control solenoid, wherein the second logic control valve assembly has a valve spool movable between a first and a second position;

a logic valve control solenoid having an inlet port in downstream fluid communication with the first pressure control solenoid and an outlet port in upstream fluid communication with the first and second logic valve assemblies;

a first actuator in downstream fluid communication with the first logic valve assembly, wherein the first actuator is movable between a first, second and third position when the valve spool of the first logic control valve assembly is in the first position;

a second actuator in downstream fluid communication with the first logic valve assembly, wherein the second actuator is movable between a first, second and third position when the valve spool of the first logic control valve assembly is in the second position;

a third actuator in downstream fluid communication with the second logic valve assembly, wherein the third actuator is movable between a first, second and third position when the valve spool of the second logic control valve assembly is in the first position; and a fourth actuator in downstream fluid communication with the second logic valve assembly, wherein the fourth actuator is movable between a first, second and third position when the valve spool of the second logic control valve assembly is in the second position, wherein the second pressure control solenoid generates a first hydraulic fluid pressure and the third flow control solenoid varies hydraulic fluid flow to at least one of the first and second actuators to move at least one of the first and second actuators into at least one of the first, second, and third positions and wherein the third pressure control solenoid generates a second hydraulic fluid pressure and the fourth flow control solenoid varies hydraulic fluid flow to at least one of the third and fourth actuators to move at least one of the third and fourth actuators into at least one of the first, second, and third positions, wherein the logic valve control solenoid is configured to communicate a third pressurized hydraulic fluid from the first pressure control solenoid to the first and second logic valve assemblies in order to move each of the valve spools of the first and second logic valve assemblies to the second positions, and wherein each of the first, second, third, and fourth actuators is configured to position a synchronizer between at least an engaged position and a neutral position and wherein the first and second positions of each of the first, second, third, and fourth actuators corresponds to one of the neutral and engaged positions of the synchronizer.

10. The hydraulic control system of claim 9 wherein the first, second, third, and fourth actuators are moved between their first and second positions by moving the valve spools of the first and second logic valve assemblies and varying the first and second flows of hydraulic fluid to either overcome or not overcome a force generated by each of the first and second pressurized hydraulic fluids acting on each of the first, second, third, and fourth actuators.

11. The hydraulic control system of claim 10 wherein the source includes a pump and an accumulator.

* * * * *